United States Patent [19]
James et al.

[11] Patent Number: 5,254,449
[45] Date of Patent: Oct. 19, 1993

[54] PHOTOGRAPHIC ELEMENT CONTAINING THINB TRANSPARENT MAGNETIC RECORDING LAYER AND METHOD FOR THE PREPARATION THEREOF

[75] Inventors: Robert O. James; John Rieth, both of Rochester, N.Y.

[73] Assignee: Eastman Kodak Company, Rochester, N.Y.

[21] Appl. No.: 807,424

[22] Filed: Dec. 13, 1991

Related U.S. Application Data

[63] Continuation of Ser. No. 473,494, Feb. 1, 1990, abandoned.

[51] Int. Cl.$^5$ .................................. G03C 5/14
[52] U.S. Cl. ..................... 430/533; 430/140; 430/531; 430/935
[58] Field of Search ............... 430/935, 140, 531, 533; 427/131, 407; 252/62.54

[56] References Cited

U.S. PATENT DOCUMENTS

| | | | |
|---|---|---|---|
| 2,932,855 | 4/1960 | Barlett et al. | 18/57 |
| 3,782,947 | 1/1974 | Krall | 96/67 |
| 3,870,525 | 3/1975 | Yamamoto et al. | 430/140 |
| 4,279,945 | 7/1981 | Audran et al. | 427/130 |
| 4,911,951 | 3/1990 | Ogawa et al. | 427/131 |
| 4,990,276 | 2/1991 | Bishop et al. | 252/62.54 |

FOREIGN PATENT DOCUMENTS

| | | |
|---|---|---|
| 686172 | 5/1964 | Canada . |
| 60-53952 | 3/1985 | Japan . |

OTHER PUBLICATIONS

Research Disclosure 17643, 1979.

*Primary Examiner*—Charles L. Bowers, Jr.
*Assistant Examiner*—Thorl Chea
*Attorney, Agent, or Firm*—Robert A. Gerlach

[57] ABSTRACT

A photographic element comprising a photosensitive layer, a flexible cellulose organic ester support film, and a substantially transparent magnetic recording layer having a dried thickness of less than about 1.5 micron exhibits improved magnetic and photographic performance and is particularly valuable as a color or black and white negative or reversal film.

A method of preparing the above-described element comprises the steps of
continuously extruding a layer of a cellulose organic acid ester solution from a hopper toward a polished casting surface which is moving relative to the hopper;
continuously extruding simultaneously a layer of a magnetic dispersion from the same hopper onto the extruded layer of cellulose organic acid ester;
depositing the combined layers onto the casting surface with the cellulose organic acid ester layer engaging the polished surface; and
stripping the combined support film and magnetic recording layer from the casting surface when the layers are sufficiently set to be self-supporting and to allow such stripping. The method is more efficient and less costly than prior art processes and avoids the need for large quantities of solvents and complex processing steps.

8 Claims, 2 Drawing Sheets

PHOTOGRAPHIC ELEMENT CONTAINING THINB TRANSPARENT MAGNETIC RECORDING LAYER AND METHOD FOR THE PREPARATION THEREOF

This is a continuation of application Ser. No. 07/473,494, filed Feb. 1, 1990, abandoned.

CROSS REFERENCE TO RELATED APPLICATION

Reference is hereby made to commonly-assigned copending U.S. patent application Ser. No. 473,500, issued as U.S. Pat. No. 4,990,276, Feb. 5, 1991 entitled MAGNETIC DISPERSION filed in the names of J. F. Bishop, R. O. James and D. E. Kestner concurrently herewith.

BACKGROUND OF THE INVENTION

1. Field of the Invention

This invention relates to photographic elements, and more particularly, to photographic elements containing a magnetic recording layer.

2. Description Relative to the Prior Art

Conventional magnetic recording elements that are used for recording sounds or images are generally opaque to visible light regardless of the nature of the magnetic particles used in such elements. For example, motion picture films often are provided with a magnetic sound track which generally is opaque and does not cover that portion of the film used in the projection of images.

Canadian Patent 686,172 shows that a magnetic recording layer may be transparent to visible light when it contains low concentrations of magnetizable particles. According to this patent, such a layer is coated over a layer containing descriptive material which allows a user to simultaneously hear and see certain subject matter. However, this patent points out that the electromagnetic characteristics, i.e., the magnetic recording and reproducing characteristics, of such a layer are inferior to those of conventional magnetic layers as a result of the very low concentration of magnetizable particles.

U.S. Pat. No. 3,782,947 discloses a photographic product which carries magnetic particles distributed across the image area of the product. The particle distribution and sizes are so designed that the composite granularities of the photographic and magnetic recording media are such that the magnetic distribution is essentially transparent in a photographic sense. According to this patent, the photographic image can be viewed via the magnetic distribution and the magnetic distribution can be employed for recording and playback information.

U.S. Pat. No. 4,279,945 discloses a process of preparing magnetic recording elements containing a transparent recording layer. According to this patent, the magnetic recording and reproducing characteristics obtained are comparable to conventional opaque magnetic layers without the need for matching the granularity of a magnetic medium to that of a photographic medium. However, the process requires that the layer containing magnetic particles be treated using one or both of the following process steps, (1) compacting the layer while it is in a malleable state to reduce its thickness (e.g., calendaring), or (2) imbibing into the layer a substantially transparent liquid having a refactive index that is substantialy the same as that of the binder.

Elements of the type described in the above-cited patents have not achieved widespread commercial success for various reasons. For example, the elements described in U.S. Pat. No. 4,279,945, as indicated by the Figure therein, are substantially opaque at wavelengths less than about 500 nm and thus are not useful in color films. Further, the disclosed process requires that the magnetic recording layer be calendered while it is in a malleable state and/or that a transparent liquid be imbibed into the magnetic recording layer. On the other hand, U.S. Pat. No. 3,782,947 contemplates coating a dispersion containing magnetic particles onto a film base. However, the quantity of solvent required in such a process is unattractive from both an economic and environmental standpoint. Additionally, in continuous wide web coating techniques adapted for commercial manufacturing operations, solvent attack on the film base can render the element unusable, resulting in unacceptable manufacturing inefficiences and excessive costs. Moreover, it is difficult to prepare magnetic recording layers in such a coating process having a thickness of less than about 5 microns.

It is evident that it would be highly desirable to provide photographic elements having a transparent magnetic recording layer exhibiting improved magnetic and photographic performance. It is further evident that it would be desirable to provide a method for preparing such elements which avoids the complex processing steps and the problems associated with the use of large quantities of solvents of the prior art processes discussed above and which is more efficient and cost effective from a commercial standpoint.

SUMMARY OF THE INVENTION

We have discovered that a photographic element containing a very thin transparent magnetic recording layer and exhibiting improved magnetic and photographic properties can be prepared by co-casting a magnetic dispersion with a cellulose organic acid ester solution.

More specifically, in accordance with this invention, there is provided a photographic element comprising a photosensitive layer, a flexible cellulose organic ester support film, and a substantially transparent magnetic recording layer having a thickness of less than about 1.5 micron.

In another aspect, the present invention provides a method of preparing the above-described element which comprises the steps of continuously extruding a layer of a cellulose organic acid ester solution from a hopper toward a polished casting surface which is moving relative to the hopper;

continuously extruding simultaneously a layer of a magnetic dispersion from the same hopper onto said extruded layer of cellulose organic acid ester;

depositing the combined layers onto the casting surface with the cellulose organic acid ester layer contacting the polished surface; and stripping the combined support film and magnetic recording layer from the casting surface when the layers are sufficiently set to be self-supporting and to allow such stripping.

It is an advantageous feature of this invention that there are provided photographic elements containing a transparent magnetic recording layer having a thickness of less than about 1.5 micron which exhibit improved magnetic performance and no increase in graininess attributable to the magnetic recording layer due partly to the thinness of such layer.

It is another advantageous feature of this invention that there is provided a process for preparing photographic elements having a transparent magnetic recording layer which avoids the problems of the prior art processes associated with the use of large quantities of solvents and complex processing steps, and which is more efficient and cost effective from a commercial standpoint.

It is yet another advantageous feature of this invention that there is provided a photographic element which minimizes light piping.

Other advantageous features will become readily apparent upon reference to the following description of the preferred embodiments when read in light of the accompanying drawings.

DESCRIPTION OF THE PREFERRED EMBODIMENTS

Figure 1:
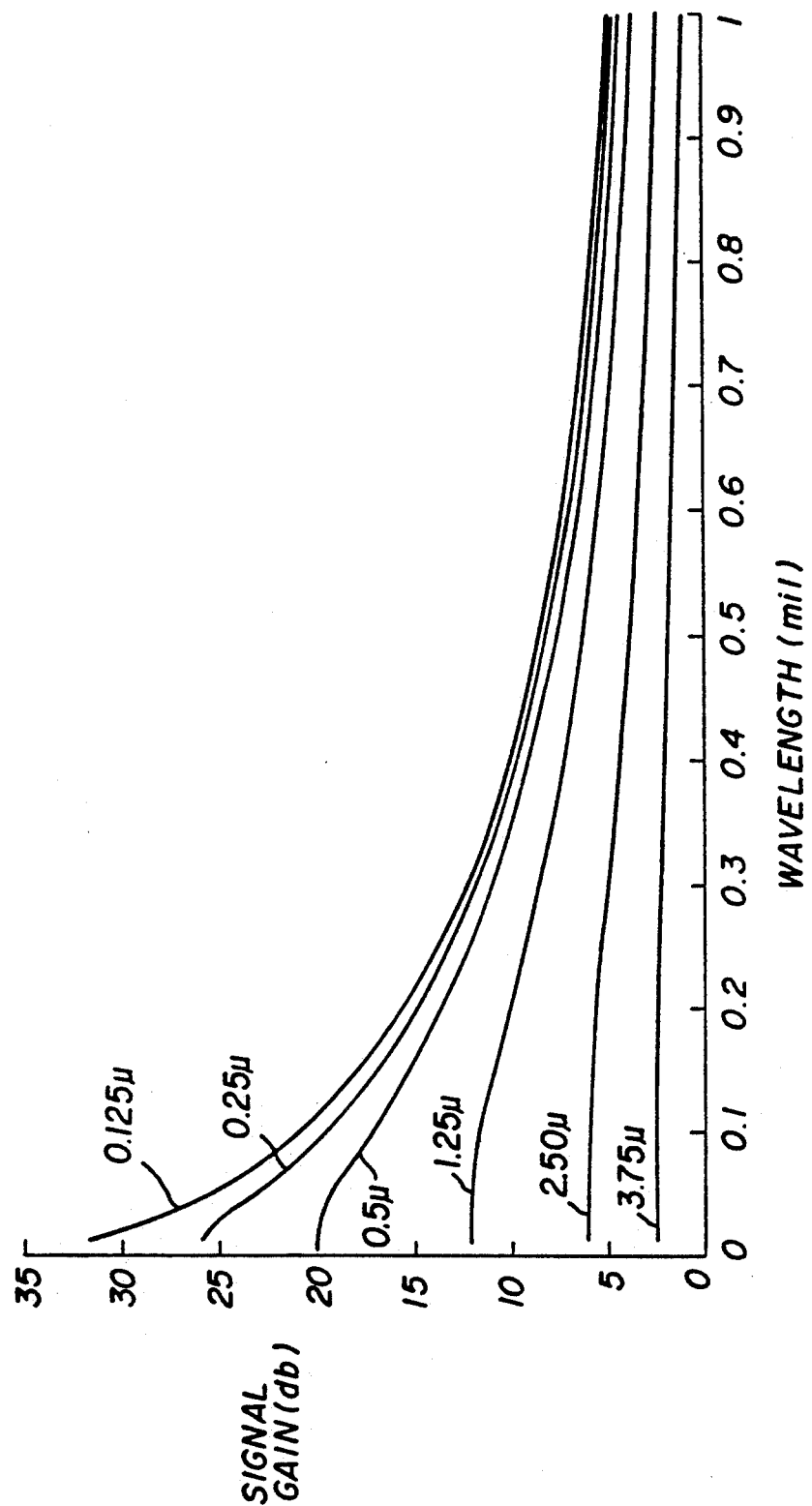
FIG. 1 is a plot of magnetic signal gain as a function of wavelength for various magnetic layer thicknesses illustrating the improved signal gain resulting from an element of the invention containing a thin transparent magnetic recording layer.

The description which follows concerns useage of a thin transparent magnetic recording layer and a flexible cellulose organic ester support film in conjunction with a photosensitive layer in a photosensitve element adapted for use as a color or black and white negative or reversal film. In addition, the thin transparent magnetic recording layer is useful in other photographic elements such as motion picture films and in conventional applications wherein magnetic recording media find utility including, for example, magnetic sound and video tape.

As stated above, the photographic element of this invention includes a substantially transparent magnetic recording layer. By "substantially transparent", it is meant that the magnetic particles are sufficiently dispersed and of a size and distribution to permit substantial transmittance, e.g., more than about 63% of visible light through the magnetic recording layer to the photosensitive layer. More specifically, the substantially transparent magnetic recording layer in accordance with this invention increases the optical density of the photographic element by less than 0.2 optical density unit across the visible portion of the spectrum from 400 to 700 nm. In other words, the photographic element of this invention exhibits an optical density from 400 to 700 nm within 0.2 unit of the same element except not containing the magnetic recording layer. Preferred elements according to this invention contain a magnetic recording layer which increases the optical density of the element by less than 0.1 unit, even more preferably by less than 0.05 unit, across the visible portion of the spectrum from 400 to 700 nm.

The magnetic particles dispersed in the transparent recording layers in accordance with this invention preferably are acicular or needle-like magnetic particles. The average length of these particles along the major axis preferably is less than about 0.3, more preferably, less than about 0.2 micron. The particles preferably exhibit an axial ratio, that is, a length to diameter thickness ratio of up to about 5 or 6 to 1. Preferred particles have a specific surface area of at least 30 $m^2/g$, more preferably, of at least 40 $m^2/g$. Typical acicular particles of this type include, for example, particles of ferro- and ferri-magnetic iron oxides such as $\gamma$-ferric oxide, complex oxides of iron and cobalt, various ferrites, and metallic iron pigments. Alternatively, small tabular particles such as barrium ferrites and the like can be employed. The particles can be doped with one or more ions of a polyvalent metal such as titanium, tin, cobalt, nickel, zinc, manganese, chromium, or the like as is known in the art. A preferred particle consists of Co surface treated $\gamma$-$Fe_2O_3$ having a specific surface area of greater than 40 $m^2/g$. Particles of this type are commercially available and can be obtained from Toda Kogyo Corporation under the trade names CSF 4085V2, CSF 4565V, CSF 4585V and CND 865V and are available on a production scale from Pfizer Pigments Inc. under the trade designations RPX-4392, RPX-5003, RPX-5026 and RPX-5012. For good magnetic recording, the magnetic particles preferably exhibit coercive force above about 500 Oe and saturation magnetization above 70 emu/g.

Figure 4:
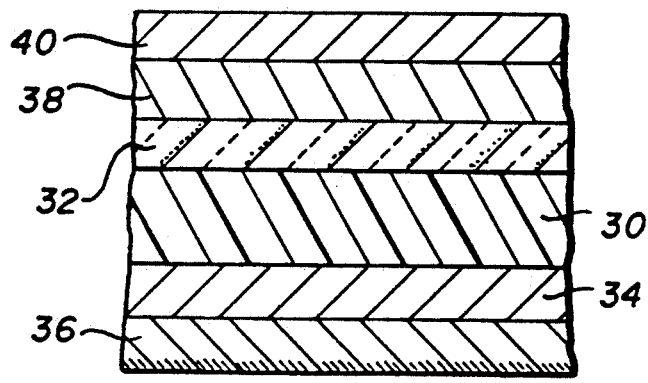
FIG. 4 is a cross-sectional view showing a photographic element in accordance with this invention.

The substantially transparent magnetic recording layer according to this invention has a dried thickness of less than about 1.5 micron. A particularly advantageous feature of this invention is that transparent magnetic recording layers can be provided which are thinner than the thinnest magnetic layers which can be prepared by conventional solvent coating techniques. This results in improved magnetic performance. As illustrated in FIG. 4, at a wavelength of 0.1 mil (2.5$\mu$) a signal gain of 20 db is obtained when the thickness of the transparent magnetic recording layer is decreased from 5.0 to 0.5 micron. In preferred embodiments of the invention, the transparent magnetic recording layer has a thickness of less than about 1.0 micron. Remarkably, it is believed that transparent magnetic recording layers having a thickness of less than 0.50 micron can be attained in accordance with this invention.

The support film and transparent magnetic recording layer preferably are provided in the form of a composite unitary structure consisting of at least the flexible cellulose organic ester support film and the substantially transparent magnetic recording layer prepared in a co-casting process as described in the Summary above.

In forming the transparent magnetic recording layer in accordance with the invention, the above-described magnetic particles are homogeneously dispersed in a substantially transparent binder and a solvent for the binder. A preferred class of binders are cellulose organic acid esters. The preferred binder is cellulose acetate although other binders expected to be useful herein include cellulose diacetate, cellulose triacetate, cellulose acetate butyrate, cellulose nitrate and cellulose acetate propionate. Suitable solvents include methylene chloride, methyl alcohol, methyl ethyl ketone, methyl isobutyl ketone, ethyl acetate, butyl acetate, cyclohexanone, butyl alcohol, dimethylformamide and the like as well as mixtures thereof. The dispersing medium can also contain transparent addenda, for example, plasticizers such as tricresyl phosphate, dibutyl phthalate or dioctyl phthalate; lubricants such as carbonic acid mixed esters such as ethyl cetyl phosphate, stripping acids, and the like.

In preferred embodiments of the invention, a dispersing or wetting agent is added to facilitate dispersion of the magnetic particles. Useful dispersing agents include a fatty acid amine, and commercially available wetting agents or surfactants such as Witco Emcol CC59 which is quaternary amine available from Witco Chemical Corp., Gafac PE 510, Gafac RE 610, Gafac RE 960, and Gafac LO 529 which are phosphoric acid esters available from GAF Corp. The dispersion can be formed by diluting a concentrate consisting essentially of the magnetic particles and optionally a wetting agent dispersed in dibutyl phthalate with a solvent solution including the binder. Details of a preferred dispersion preparation and dilution procedure are set forth in U.S. patent application Ser. No. 473,500 cited above, the disclosure of which is hereby incorporated by reference in its entirety.

The element of the invention includes a support film for color or black and white negative or reversal film applications which preferably is substantially transparent. Suitable support materials include cellulose organic acid esters such as cellulose acetate, cellulose diacetate, cellulose triacetate, cellulose acetate butyrate, cellulose acetate propionate and the like. Cellulose acetate is preferred. The support film can be cast according to methods known in the art from a dope including one or more of the above-described cellulose organic acid esters and a solvent such as methylene chloride or any other solvent selected from those described above or mixtures thereof. The support film dope can include any of the conventional addenda known in the art to be useful therein including the transparent plasticizers discussed above, stripping aids, and so forth.

Figure 2:
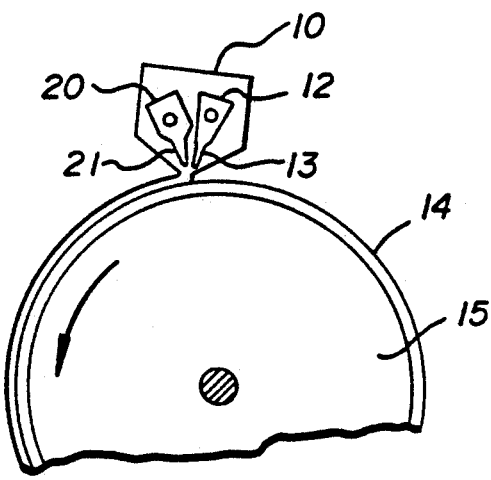
FIG. 2 is a schematic view showing apparatus by means of which the method of the invention is carried out.
Figure 3:
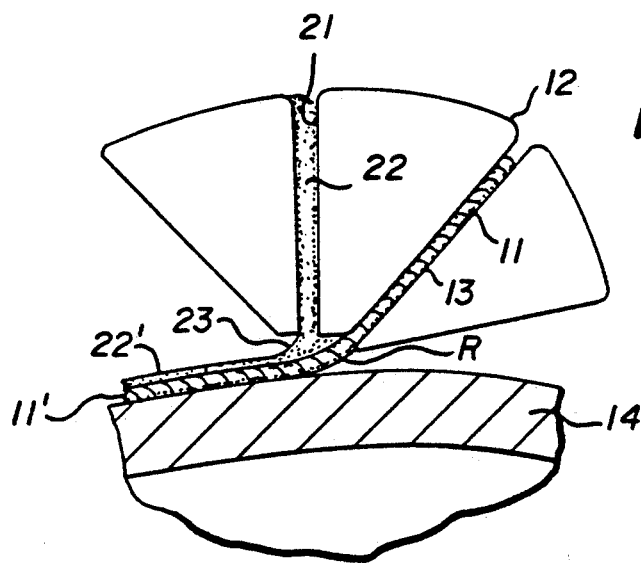
FIG. 3 is an enlarged cross-sectional view showing apparatus adapted for preparing the photographic element in accordance with this invention.

Referring now to FIGS. 2 and 3, an apparatus suitable for carrying out the method of the invention is shown. The apparatus comprises a dual hopper 10 which can be the combination of two conventional extrusion slot hoppers, although this is not necessary. The dope from which the support film is cast ordinarily is of relatively high visocity and is extruded under pressure, whereas the magnetic dispersion need not be extruded under pressure because only a metering action is required to feed this dispersion to the bead. In preferred embodiments, however, the magnetic dispersion is extruded under pressure.

The cellulose organic acid ester solution 11 which is to be cast is fed into compartment 12 under pressure so that it is extruded under pressure from a narrow-extrusion slot 13 in the form of a ribbon R. In the second compartment 20 of the hopper there is a supply of magnetic dispersion 22 which is adapted to be coated from a narrow extrusion slot 21 onto the surface of the ribbon R of extruded cellulose organic acid ester solution. Magnetic dispersion 22 preferably is applied to the side of the extruded ribbon R such that the coating of cellulose organic acid solution 11' directly engages moving support surface 14 and the layer 22' of the magnetic dispersion is spaced from the supporting surface thereby. In operation, a bead 23 of the dispersion is maintained between a portion of the hopper and the surface of the extruded ester solution. The surface of the ester layer moves across the bead and is coated with a thin layer of the dispersion by a bead action. A quantity of the magnetic dispersion is continuously fed into the bead at the same rate at which it is being taken away by the layer of ester solution. Moving support surface 14 can be a polished casting surface, for example, a plated wheel 15 as shown in FIG. 2, or an endless band onto which the streams of support film and magnetic dispersion are deposited to be stripped therefrom after the combined support film and magnetic recording layers are sufficiently set to allow such stripping.

In preferred embodiments, the magnetic dispersion can be coated by a stretch flow mechanism at viscosities which would not sustain the flow circulation required of a bead. In this instance, a self-supporting layer of the magnetic dispersion is simultaneously extruded under pressure from the hopper onto the extruded layer of cellulose organic acid ester film. A bead is not formed. This technique is particularly desirable from the standpoint of minimizing solvent attack on the cellulose film.

The coating hopper preferably is demagnetized by known techniques during the coating process to minimize stray undersirable magnetic fields. This helps to provide a magnetic layer with random orientation.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Addition useful coating and drying procedures are described in Research Disclosure, Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 mg/m$^2$ when uniformly distributed across the desired area of the photographic element will be sufficiently photographically transparent provided that the maximum particle size is less then about 1 micron. Particle concentrations less than about 10 mg/m$^2$ tend to be insufficient for magnetic recording purposes and particle concentrations greater than about 1000 mg/m$^2$ tend to be too dense for photographic purposes. Particularly useful particle concentrations are in the range of 20–70 mg/m². Concentrations of about 20 mg/m² have been found to be particularly useful in reversal films.

The photographic elements according to this invention can contain one or more conducting layers such as antistatic layers and/or anti-halation layers such as described in Research Disclosure, Vol. 176, December 1978, Item 17643 to prevent undesirable static discharges during manufacture, exposure and processing of the photographic element. Antistatic layers conventionally used in color films have been found to be satisfactory for use herewith.

The photographic elements according to this invention can be provided with a protective layer, such as a wax layer, on or over the transparent magnetic recording layer.

A preferred photographic element according to this invention is illustrated in FIG. 4. As shown therein, element 50 includes flexible cellulose organic ester support film 30 having disposed thereon thin transparent magnetic recording layer 32. Optional subbing layer 34 is disposed between support film 30 and photosensitive layer 36. Antistatic layer and/or anti-halation layer 38 and wax layer 40 are disposed on the side of transparent magnetic layer 32 opposite support film 30.

EXAMPLES

The following examples further illustrate the invention.

EXAMPLE 1

| Dispersion Ingredients | Weight Percent | g |
|---|---|---|
| Magentic particle Toda CSF-4085V2 | 45.0 | 4500 |
| Dispersing Agent Gafac PE-510 (GAF Corp.) | 2.25 | 225 |
| Dispersing Medium dibutyl phthalate | 52.75 | 5275 |

The above ingredients were blended in a temperature controlled jacketed vessel and mixed together with a high speed disperser and the appropriately sized Cowles type dispersion blade at a tangential blade speed of 4000 feet per minute for 120 minutes. The blade diameter is selected so it is about ⅓ the mixing vessel diameter. The blade was positioned in the mixing vessel so that it was about 1 blade diameter from the bottom of the vessel. The water jacket temperature was held at 25° C. Once a consistant dispersion was achieved free of excessively large particle aggregates, the dispersion was processed in a sand mill, a horizontal media mill of the peg-type design. The grinding media was 1 millimeter zirconium silicate spheres. The grinding chamber volume was 2.48 liter and 2.1 liters of grinding media was added to the grinding zone. The shaft speed was maintained at top speed of 1800 feet per minute. The grinding chamber is water jacketed to 10° C. to control the product temperature. The premix is pumped through the grinding chamber 8 consecutive times so that the total residence time of the premix in the grinding zone is 25–30 minutes. Dispersions prepared in this fashion exhibit excellent colloidal stability on aging and do not contribute to the image grain of films coated with low levels of this particle.

A dispersion prepared as described above was diluted with a cellulose triacetate solution in methylene dichloride and methyl alcohol in a high shear mixer to yield the following casting composition.

| Casting Composition | Weight Percent |
|---|---|
| Methylene dichloride | 93.775 |
| Methyl alcohol | 3.000 |
| Cellulose triacetate | 3.000 |
| Dibutyl phthalate | 0.11 |
| Co-surface treated $\gamma$-$Fe_2O_3$ particles (available from Toda under the name CSF 4085 V2) | 0.11 |
| Dispersing agent (GAFAC PE-510 available from GAF) | 0.005 |

This casting composition was extruded under pressure with a cellulose acetate base in accordance with the stretch-flow procedure discussed above such that the pigment laydown was from 20 mg/m² to 100 mg/m² to form a thin transparent magnetic recording layer having a thickness of about 1 μm. At these levels of pigment, coded information can be written and read from the magnetic recording layer by use of suitable write/playback heads.

In addition to the magnetic pigments, various dyes such as magenta and blue dyes can also be formulated into the pigmented layer to give neutral density films for the purpose of making reversal (color slide) films.

Films prepared in accordance with this invention surprisingly exhibited reduced light piping, presumably due to the magnetic layer absorbing or diffusing any light that might light pipe longitudinally along the path of the film base. Ordinarily, light piping protection is provided by incorporating neutral density dyes in the base. Films prepared in accordance with this invention do not necessarily require such a dye to achieve light piping levels acceptable for commercial use.

The invention has been described in detail with particular reference to preferred embodiments thereof, but it will be understood that variations and modifications can be effected within the spirit and scope of the invention.

What is claimed is:

1. A photographic element comprising a photosensitive layer, a flexible cellulose organic acid ester support film, and adjacent thereto a substantially transparent magnetic recording layer containing magnetic particles in a binder said magnetic particles having a specific surface area of at least 30 m²/g, said magnetic recording layer having a dried thickness of less than about 1.5 micron and increases the optical density of the photographic element by less than 0.2 optical density unit across the visible portion of the spectrum from 400 to 700 nm.

2. The element of claim 1 wherein said magnetic recording layer is disposed substantially across the photosensitive area of the element.

3. The element of claim 1 wherein said magnetic particles are cobalt surface treated $\gamma$-$Fe_2O_3$ particles.

4. The element of claim 1 wherein said magnetic particles are acicular particles having an average length of less than 0.3 micron.

5. The element of claim 1 wherein said magnetic particles are present in a concentration from 10 to 1000 mg/m².

6. The photographic element of claim 1 wherein the magnetic recording layer is disposed substantially across the photosensitive area of the element, the magnetic particles of the transparent magnetic recording layer being acicular cobalt surface treated $\gamma$-Fe$_2$O$_3$ particles having an average length less than 0.3 micron and a specific surface area of at least 30 m$^2$/g, the magnetic particles being present in a concentration of from 10 to 1000 mg/m$^2$.

7. The photographic element of claim 6 wherein the transparent magnetic recording layer increases the optical density of the photographic element by less than 0.1 optical density unit across the visible portion of the spectrum from 400 to 700 nm.

8. The photographic element of claim 1 wherein the magnetic particles of the transparent magnetic recording layer are present in a concentration of from 20 to 70 mg/m$^2$.

* * * * *